United States Patent [19]

Yamada et al.

[11] Patent Number: 5,242,467
[45] Date of Patent: Sep. 7, 1993

[54] REACTIVE DYE MIXTURES AND DYEING METHODS USING THEM: C.I. REACTIVE ORANGE NUMBERS 16 AND 7

[75] Inventors: Yuji Yamada, Shizuoka; Mitsuhiro Suzuki, Iwata; Kensuke Suzuki, Shizuoka, all of Japan

[73] Assignee: Hoechst Mitsubishi Kasei Co., Ltd., Tokyo, Japan

[21] Appl. No.: 936,631

[22] Filed: Aug. 28, 1992

[30] Foreign Application Priority Data

Aug. 30, 1991 [JP] Japan .................................. 3-220077

[51] Int. Cl.$^5$ ...................... C09B 62/04; C09B 62/20; C09B 62/343; C09B 67/22

[52] U.S. Cl. .......................................... 8/549; 8/524; 8/527; 8/543; 8/641; 8/683; 8/917; 8/918; 8/924; 8/926

[58] Field of Search ................................... 8/549, 641

[56] References Cited

U.S. PATENT DOCUMENTS 4,384,868  5/1983  Sunami et al. ........................ 8/524

*Primary Examiner*—A. Lionel Clingman
*Attorney, Agent, or Firm*—Oblon, Spivak, McClelland, Maier & Neustadt

[57] ABSTRACT

A reactive dye mixture which comprises, as dye components, from 10 to 57% by weight of C.I. Reactive Orange 16 and from 90 to 43% by weight of C.I. Reactive Orange 7.

9 Claims, No Drawings

REACTIVE DYE MIXTURES AND DYEING METHODS USING THEM: C.I. REACTIVE ORANGE NUMBERS 16 AND 7

The present invention relates to orange reactive dye mixtures which are excellently soluble in water and in an aqueous alkali solution and which are capable of presenting a uniform and high color yield when cellulosic fibers are dyed therewith, and methods for dyeing cellulosic fibers using such dye mixtures.

Reactive dyes have been commonly used in the field of e.g. dip dying or printing of cellulosic fibers, since they are excellent in clearness and various types of fastness and since there has been a trend for natural fibers in recent years, particularly a trend of using cellulosic fibers. Further, the reactive dyes have been commonly used as energy-saving type dyes in a cold pad batch dyeing method.

In the cold pad batch dyeing method, a dye solution is prepared, and then a predetermined alkali agent such as sodium hydroxide or sodium silicate is added. At this stage, the reactive dye is required to have a high solubility in water and in an aqueous alkali solution. Further, the reactive dye is required to be stable for a long period of time without precipitation or gelation when dissolved in an aqueous alkali solution in the subsequent padding stage. However, C.I. Reactive Orange 16 which is one of a reactive dye, has poor solubility in water and aqueous alkali solution, and can not be maintained in a stable state as dissolved in an aqueous alkali solution for a long period of time. Accordingly, it is thereby difficult to obtain a dyed product having a uniform and high color yield. To overcome this drawback, for example, Japanese Examined Patent Publication No. 26788/1988 proposes a reactive dye composition for cellulose fibers, which comprises a dye mixture comprising from 60 to 97% by weight of C.I. Reactive Orange 16 and from 40 to 3% by weight of C.I. Reactive Orange 7, and which contains a condensation product of a naphthalenesulfonic acid which may be alkylated with formaldehyde, and a sulfonation degree of said condensation product being from 100 to 200%, in an amount of from 5 to 100 parts by weight per 100 parts by weight of the dye mixture. However, with such a composition of the above publication, the solubility in water is at best 25% by weight and is not adequate in the present state where a high concentration of the liquid product is desired. Besides, its solubility in an aqueous alkali solution is not at a satisfactory level either, failing to meet the solubility of at least 100 g/l required for high concentration dyeing.

On the other hand, the solubility of C.I. Reactive Orange 7 in water and in an aqueous alkali solution is not adequate, although it is slightly better than the solubility of C.I. Reactive Orange 16. In order to improve the solubility, it has been attempted to add, or use in combination, e.g. urea or a condensation product of naphthalene sulfonic acid with formaldehyde. However, in either case, no satisfactory results have been obtained.

The present inventors have conducted extensive studies to improve the solubility of C.I. Reactive Orange 16 and C.I. Reactive Orange 7 in water and in an aqueous alkali solution and as a result, have found that a mixture prepared by mixing C.I. Reactive Orange 16 and C.I. Reactive Orange 7 in a certain specific ratio, and a mixture obtained by desalting an inorganic salt from a mixture having C.I. Reactive Orange 16 and C.I. Reactive Orange 7 mixed in a certain specific ratio, not only show remarkable solubility in water and in an aqueous alkali solution but also can be maintained in a stable state as dissolved in water and in an aqueous alkali solution for a long period of time, and further that when cellulosic fibers are dyed with the dye composition composed of such a mixture, it is possible to obtain a dyed product having a uniform and high color yield.

Thus, the present invention provides a reactive dye mixture which comprises, as dye components, from 10 to 57% by weight of C.I. Reactive Orange 16 and from 90 to 43% by weight of C.I. Reactive Orange 7, and a method for dyeing cellulosic fibers, which is characterized by using such a reactive dye mixture.

Further, the present invention provides a reactive dye mixture which comprises, as dye components, from 10 to 85% by weight of C.I. Reactive Orange 16 and from 90 to 15% by weight of C.I. Reactive Orange 7 and which contains an inorganic salt in an amount of at most 5 parts by weight per 100 parts by weight of the dye mixture comprising the C.I. Reactive Orange 16 and the C.I. Reactive Orange 7, and a method for dyeing cellulosic fibers, which is characterized by using such a reactive dye mixture.

Now, the present invention will be described in detail.

C.I. Reactive Orange 16 and C.I. Reactive Orange 7 used in the present invention, are dyes composed mainly of compounds having the following formulas (I) and (II), respectively, in the form of the respective free acids:

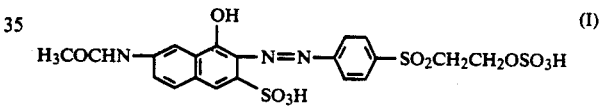

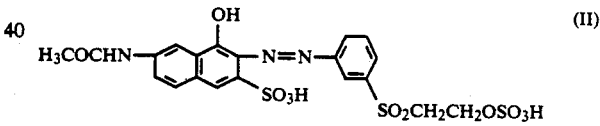

Each of these dyes may contain a certain by-product formed during the process for the production of the dye of the above formula (I) or (II) i.e. a small amount of a compound of the above formula (I) or (II) wherein the reactive group $-SO_2CH_2CH_2OSO_3H$ is replaced by $-SO_2CH=CH_2$.

Depending upon the particular purpose, the dye of the formula (I) or (II) may be treated, for example, in the presence of hydroxyl ions, so that it is in the form of a compound of the above formula (I) or (II) wherein the reactive group $-SO_2CH_2CH_2OSO_3H$ is replaced by $-SO_2CH=CH_2$. Further, the dye of the formula (I) or (II) may be present in the form of a salt. Specifically, an alkali metal salt, an alkaline earth metal salt or a quaternary ammonium salt may, for example, be mentioned as the salt.

The mixing ratio of the respective dyes in the dye mixture of the first aspect of the present invention is such that the ratio of C.I. Reactive Orange 16/C.I. Reactive Orange 7 is from 10 to 57% by weight/from 90 to 43% by weight, preferably from 20 to 55% by weight/from 80 to 45% by weight, more preferably from 40 to 55% by weight/from 60 to 45% by weight. If the mixing ratio of the respective dyes exceeds this range, not only the solubility in water or in an aqueous alkali solution is lowered, but also it becomes difficult to obtain a dyed product having a high color yield.

The dye mixture according to the first aspect of the present invention can be obtained by mixing the dyes of the above formulas (I) and (II). However, the dyes (I) and (II) can be synthesized in the form of a mixture. Specifically, 2-amino-8-hydroxynaphthalene-6-sulfonic acid is acetylated with acetic anhydride in accordance with a conventional method, then 4-aminophenyl-β-sulfatoethylsulfone and 3-aminophenyl-β-sulfatoethylsulfone are mixed in an optional ratio for diazotization, followed by coupling with the above acetylated product to obtain a dye mixture.

On the other hand, the dye mixture according to the second aspect of the present invention is a dye mixture wherein the mixing ratio of C.I. Reactive Orange 16/C.I. Reactive Orange 7 is from 10 to 85% by weight/from 90 to 15% by weight, and the content of an inorganic salt is at most 5 parts by weight per 100 parts by weight of the dye mixture comprising C.I. Reactive Orange 16 and C.I. Reactive 7. Namely, the dye mixture usually contains an inorganic salt contained in the dye intermediates or an inorganic salt formed during the reaction, and the mixture containing such an inorganic salt may be used as it is. However, in the present invention, the dye mixture obtained as described above may be desalted by means of e.g. a reverse osmotic membrane, so that the solubility in water or in an aqueous alkali solution can be remarkably improved.

In the dye mixture according to the second aspect of the present invention, the mixing ratio of C.I. Reactive Orange 16/C.I. Reactive Orange 7 is preferably from 20 to 75% by weight/from 80 to 25% by weight, more preferably from 40 to 55% by weight/from 60 to 45% by weight. The content of the inorganic salt is preferably at most 3 parts by weight, more preferably at most 1.5 parts by weight, per 100 parts by weight of the mixture of the C.I. Reactive Orange 16 and the C.I. Reactive Orange 7. As the inorganic salt contained in the dye mixture, sodium sulfate or sodium chloride may, for example, be mentioned.

At the time of use, the dye mixture of the present invention may be used in any optional form. Specifically, it may, for example, be a solid in a powder, particulate or granular form or a liquid such as a solution containing water or a suitable solvent as a medium, a slurry or a paste. Further, various conventional additives such a diluent and a dedusting agent as well as known additives such as a dispersant and a surfactant may be incorporated depending upon the particular dyeing method or the particular use.

The dye mixture of the present invention is useful for dyeing cellulosic fibers including, for example, natural fibers such as cotton and linen, semi-synthetic fibers such as viscose rayon and cupra ammonium rayon and fabrics and knitted fabrics produced therefrom; amino group-containing fibers such as wool, silk, synthetic polyamides and polyurethanes, and fabrics and knitted fabrics produced therefrom; and blended yarns, blended yarn fabrics, combined filament yarn, combined filament yarn fabrics blended woven fabrics and blended textile fabrics of the above cellulose fibers and the amino group-containing fibers.

The dye mixture of the present invention can be used in accordance with various dyeing methods which have been commonly applied to reactive dyes, such as, a cold pad batch method, an exhaustion-dyeing method and a printing method, under usual conditions.

For example, when cellulose fibers are to be dyed by a cold pad batch method, padding is conducted at a temperature of from 20° to 40° C. using an inorganic neutral salt such as anhydrous Glauber's salt or sodium chloride and an alkali compound such as sodium hydroxide or sodium silicate, followed by drying and then by steaming or dry heat treatment to fix the dye.

In the case of exhaustion dyeing, an alkali compound such as sodium carbonate, socium bicarbonate, trisodium phosphate, sodium hydroxide, lithium carbonate or triethyl amine, an inorganic neutral salt such as Glauber's salt or sodium chloride and if necessary, a penetrating agent and a leveling agent, are added to a dye solution, and then dyeing is conducted. In such a case, the alkali compound is used usually in an amount of from 5 to 40 g per liter of the dye bath, and the inorganic neutral salt is used usually in an amount of from 20 to 100 g per liter of the dye bath. The temperature for dyeing is usually from 40° to 80° C.

In the case of printing method, there is a one-phase method wherein printing is conducted by means of a printing paste containing sodium carbonate or other acid binding agent, followed by steaming at a temperature of from 100° to 160° C., or a two-phase printing method wherein printing is conducted by means of a neutral or weakly acidic printing paste, the printed product is passed through an alkali bath containing an inorganic neutral salt such as sodium chloride and an acid-binding agent such as sodium hydroxide or sodium silicate, or the printed product is subjected to over padding with an alkaline electrolyte-containing padding solution, followed by steaming or dry heat treatment.

The dyed product will then be subjected to soaping, washing with water and drying.

The reactive dye mixture of the present invention has an excellent solubility particularly in water and in an aqueous alkali solution and can be maintained in a stabilized solution for a long period of time. Accordingly, a highly concentrated liquid product can be presented as a formulation for a commercial product. A dye solution of high concentration and being stable for a long period of time, can be obtained without adding a dispersant or a dissolving agent such as a condensation product of naphthalene sulfonic acid which may be alkylated with formaldehyde, which is commonly used for a dye having a low solubility. This is advantageous not only from the viewpoint of the low cost of the product but also from the viewpoint of the treatment of the residue after the dyeing operation and the treatment of waste water in the post treatment of the dyed product after dyeing. Further, this is desirable from the viewpoint of the protection of environment. Further, when the reactive dye mixture of the present invention is used for dyeing cellulose fibers, it is possible to obtain a dyed product having a uniform and high color yield. Thus, usefulness of the reactive dye mixture of the present invention is significant.

Now, the present invention will be described in detail with reference to Examples. However, it should be understood that the present invention is by no means restricted to such specific Examples.

In the following Examples, "parts" means "parts by weight". Further, the dyeing strength is represented by a relative value based on the dyeing strength of a standard product being 100%.

EXAMPLE 1 (1) Preparation of a dye solution 34 parts of C.I. Reactive Orange 16 having a dyeing strength of 139% (corresponding to 47 parts of C.I. Reactive Orange 16) and 37 parts of C.I. Reactive Orange 7 having a dyeing strength of 143% (corresponding to 53 parts of C.I. Reactive Orange 7) were dissolved in 329 parts of hot water to obtain a liquid dye mixture A having a dyeing strength of 25%. The content of an inorganic salt in this dye mixture A was 10 parts per 100 parts of the dye content.

(2) Solubility in water

The dye mixture A was left to stand at a temperature of from 25° to 30° C. for 16 hours, whereby the dyes precipitated, and the solubility in water upon expiration of 16 hours was 120 g/l.

(3) Solubility in an aqueous alkali solution 10 g of urea was added to 64 g of the dye mixture A, and 20 ml of a liquid prepared by adding water to a mixture of 50 ml of 32.5% sodium hydroxide and 500 g of water glass of 44° Be (Baume) to make a solution of total volume of 1,000 ml, was added thereto. Further, water was added thereto to a total volume of 100 ml, and the mixture was stirred at 25° C. for 30 minutes, whereby the dye solution remained to be stable as liquid, and the solubility in the aqueous alkali solution corresponded to 160 g/l as the dye content.

(4) Dyeing 1

320 g of the dye mixture A was diluted with 300 g of water, and 10 ml of 32.5% sodium hydroxide and 100 g of water glass of 44° Be (Baume) were added thereto. Further, water was added thereto to a total volume of 1,000 ml. A mercerized cotton broad cloth was immediately immersed in this dye bath, squeezed at a pick up of 70%, directly wound up, sealed with a polyethylene film and left to stand in a constant temperature chamber of 25° C. for 16 hours. Then, the dyed product was washed with cold water and then with hot water, subjected to soaping in a cleanser solution at 95° C., followed by washing with cold water and drying. The cotton broad cloth was dyed uniformly in a deep orange shade.

(5) Dyeing 2

3.2 g of the dye mixture A was diluted with 100 g of water, then 10 g of anhydrous Glauber's salt was added thereto, and water of about 30° C. was further added thereto to a total volume of 200 ml. To this dye bath, 10 g of an unmercerized cotton knitted fabric was immersed and stirred at 30° C. for 20 minutes. Then, 4 g of sodium carbonate was added thereto, and the temperature was raised to 60° C. At this temperature, exhaustion dyeing was conducted for 60 minutes. Then, the dyed product was subjected to washing with water, washing with hot water, soaping, washing with hot water, washing with water and drying. The cotton knitted fabric was dyed uniformly in a deep orange shade.

EXAMPLE 2

400 g of the dye mixture A prepared in Example 1 was desalted by means of a reverse osmotic membrane. With respect to the amount of the permeated liquid for desalting, 25 parts of pure water per part of the dye content was used. The content of an inorganic salt after desalting was 0.1 part per 100 parts by weight of the dye content. The dye solution thus obtained was concentrated to obtain a liquid dye mixture B having a dyeing strength of 50%.

The solubility in water of the dye mixture B was determined in the same manner as in Example 1, whereby the dyes did not precipitate, and the solubility upon expiration of 16 hours was at least 500 g/l. The solubility in an aqueous alkali solution of the dye mixture B, obtained in the same manner as in Example 1, corresponded to 220 g/l as the dye content.

Further, dyeing was conducted in the same manner as Dyeing 1 in Example 1 except that 160 g of the dye mixture B was used instead of the dye mixture A, whereby the dyed product was found to be dyed uniformly in a deep orange shade. Further, dyeing was conducted in the same manner as Dyeing 2 in Example 1 except that 1.6 g of the dye mixture B was used instead of the dye mixture A, whereby the dyed product was found to be dyed uniformly in a deep orange shade.

EXAMPLE 3

16.5 parts of the same kind of C.I. Reactive Orange 16 as used in the preparation of the dye solution in Example 1 (corresponding to 23 parts of C.I. Reactive Orange 16) and 54 parts of the same kind of C.I. Reactive Orange 7 (corresponding to 77 parts of C.I. Reactive Orange 7) were dissolved in 329.5 parts of hot water to obtain a liquid dye mixture C having a dyeing strength of 25%. The content of an inorganic salt in this dye mixture C was 10 parts per 100 parts of the dye content.

The solubility in water of the dye mixture C was determined in the same manner as in Example 1, whereby the dyes precipitated, and the solubility upon expiration of 16 hours was 180 g/l. Further, the upper limit in the dye concentration where a stable liquid state can be maintained for 30 minutes in an aqueous alkali solution, was determined in accordance with the method as described in (3) in Example 1, was 120 g/l.

Further, dyeing was conducted in the same manner as Dyeing 1 in Example 1 except that the dye mixture C was used instead of the dye mixture A, whereby the cotton broad cloth was found to be dyed in a deep orange shade. Further, dyeing was conducted in the same manner as Dyeing 2 in Example 1 except that the dye mixture C was used instead of the dye mixture A, whereby the cotton knitted fabric was found to be dyed uniformly in a deep orange shade.

EXAMPLE 4

The dye mixture C obtained in Example 3, was desalted in the same manner as in Example 2. The content of an inorganic salt after desalting was 0.1 part per 100 parts by weight of the dye content. The obtained dye solution was concentrated to obtain a liquid dye mixture D having a dyeing strength of 40%.

The solubility in water of the dye mixture D was determined in the same manner as in Example 1, whereby no precipitation of the dyes was observed, and the solubility upon expiration of 16 hours, was 400 g/l. Further, the upper limit in the dye concentration where a stable liquid state can be maintained for 30 minutes in a aqueous alkali solution in accordance with the method described in (3) in Example 1, was determined and found to be 200 g/l.

Further, dyeing was conducted in the same manner as Dyeing 1 in Example 1 except that the dye mixture D was used instead of the dye mixture A, whereby the cotton broad cloth was found to be dyed in a deep orange shade. Further, dyeing was conducted in the same manner as Dyeing 2 in Example 1 except that the dyeing mixture D was used instead of the dye mixture A, whereby the cotton knitted fabric was found to be dyed in a deep orange shade.

EXAMPLE 5 (1) Preparation of a dye solution

Into a four necked flask equipped with a thermometer, a condenser and a stirrer, 850 parts of water was introduced. While maintaining the temperature at 50° C. under stirring, 142 parts of 2-amino-8-hydroxynaphthalene-6-sulfonic acid was charged, and 65 parts of a 33% sodium hydroxide solution was added thereto. Then, the temperature was raised to 60° C., and 85 parts of acetic anhydride was added for acetylation. Then, the mixture was cooled to 50° C., and 85 parts of a 33% sodium hydroxide solution and 19 parts of sodium carbonate were added thereto. Then, the temperature was raised to 90° C., and 15 minutes later, the mixture was cooled to 45° C. by external cooling and by an addition of 230 parts of water. Then, 33 parts of 35% hydrochloric acid was added thereto to adjust the pH. Then, 55 parts of sodium chloride was added thereto for salting out, and 2-acethylamino-8-hydroxynaphthalene-6-sulfonic acid was separated by filtration.

On the other hand, into a beaker equipped with a thermometer, a condenser and a stirrer, 800 parts of water was introduced, and under stirring, 70 parts of 4-aminophenyl-$\beta$-sulfatoethylsulfone and 70 parts of 3-aminophenyl-$\beta$-sulfatoethylsulfone were charged, and 20 parts of sodium carbonate was added thereto. To this solution, 3 parts of a filtering agent was added, followed by filtration. To the filtrate, 380 parts of water was added, and the mixture was cooled to 0° C. Then, 138 parts of 35% hydrochloric acid and 130 parts of a 5N sodium nitrite solution were added thereto for diazotization. After stirring for two hours, slightly excessive nitrite ions were diminished with a sulfamic acid solution, and then the above-mentioned 2-acethylamino-8-hydroxynaphthalene-6-sulfonic acid previously dissolved in 500 parts of water, was added thereto, and the pH was adjusted to 5 with about 10 parts of sodium carbonate for coupling to obtain a dye mixture solution containing the dyes of the formulas (I) and (II) in a weight ratio of 50/50. This solution was desalted using 10 l of pure water by the same reverse osmotic membrane apparatus as used in Example 1. The content of an inorganic salt after desalting was 0.1 part per 100 parts of the dye content. The obtained dye solution was concentrated to obtain a liquid dye mixture E having a dyeing strength of 50%.

(2) Solubility in water

The dye mixture E was left to stand at a temperature of from 25° to 30° C. for 16 hours, whereby no precipitation of the dyes was observed, and the solubility upon expiration of 16 hours was at least 500 g/l.

(3) Solubility in an aqueous alkali solution

In accordance with the method as described in (3) in Example 1, the upper limit in the dye concentration where the dye mixture E can be maintained in a stable liquid state for 30 minutes, was determined and found to be 220 g/l.

(4) Dyeing 1

Using the dye mixture E, a mercerized cotton broad cloth was dyed in the same manner as Dyeing 1 in Example 1, whereby the cotton broad cloth was dyed uniformly in a deep orange shade.

(5) Dyeing 2

Using the dye mixture E, an unmercerized cotton knitted fabric was dyed in the same manner as Dyeing 2 in Example 1, whereby the cotton knitted fabric was dyed uniformly in a deep orange shade.

(6) Dyeing 3

To 200 parts of the dye mixture E, 50 parts of urea, 550 parts of a printing paste, 330 parts of hot water and 20 parts of sodium bicarbonate were added to obtain a dye bath. This dye bath was left to stand for one day. Then, using this dye bath, a mercerized cotton broad cloth was subjected to printing in a usual manner, followed by steaming at 100° C. for 5 minutes. Then, the cloth was subjected to washing with cold water, washing with hot water, soaping, washing with hot water, washing with cold water and drying. The cotton broad cloth was dyed uniformly in a deep orange shade.

COMPARATIVE EXAMPLE 1

64 parts of the same kind of C.I. Reactive Orange 16 as used in the preparation of the dye solution in Example 1 (corresponding to 89 parts of C.I. Reactive Orange 16) and 8 parts of the same kind of C.I. Reactive Orange 7 (corresponding to 11 parts of C.I. Reactive Orange 7) were dissolved in 328 parts of hot water to obtain a liquid dye mixture F having a dyeing strength of 25%. The content of an inorganic salt in this dye mixture was 10 parts per 100 parts of the dye content.

The solubility in water of the dye mixture F was determined in the same manner as in Example 1, whereby the dyes precipitated, and the solubility upon expiration of 16 hours was 160 g/l. Further, in accordance with the method as described in (3) in Example 1, the upper limit in the dye concentration where a stable liquid state can be maintained for 30 minutes in an aqueous alkali solution, was determined and found to be 80 g/l.

Further, dyeing was conducted in the same manner as Dyeing 1 in Example 1 except that the dye mixture F was used instead of the dye mixture A, whereby the dyed cotton broad cloth had dyeing speck. Further, dyeing was conducted in the same manner as Dyeing 2 in Example 1 except that the dye mixture F was used instead of the dye mixture A, whereby the cotton knitted fabric was dyed only in a pale orange shade.

COMPARATIVE EXAMPLE 2

200 parts of water was added to 400 parts of the dye mixture F obtained in Comparative Example 1, and desalting was conducted in the same manner as in Example 2. The content of an organic salt after desalting was 0.1 part per 100 parts by weight of the dye content. The dye solution thus obtained, was concentrated by heating at a temperature of from 35° to 40° C. to obtain a liquid dye mixture G having a dyeing strength of 25%. The solubility in water of the dye mixture G was determined in the same manner as in Example 1, whereby the dyes precipitated, and the solubility upon expiration of 16 hours was 180 g/l. Further, in accordance with the method as described in (3) in Example 1, the upper limit in the dye concentration where a stable liquid state can be maintained for 30 minutes in an aqueous alkali solution, was determined and found to be 100 g/l.

Further, dyeing was conducted in the same manner as Dyeing 1 in Example 1 except that the dye mixture G was used instead of the dye mixture A, whereby the cotton broad cloth was dyed only in a pale orange shade.

Further, dyeing was conducted in the same manner as Dyeing 2 in Example 1 except that the dye mixture G was used instead of the dye mixture A, whereby the cotton knitted fabric was dyed only in a pale orange shade.

COMPARATIVE EXAMPLE 3

64 parts of the same kind of C.I. Reactive Orange 16 as used in the preparation of the dye solution in Example 1 (corresponding to 89 parts of C.I. Reactive Orange 16) and 8 parts of the same kind of C.I. Reactive Orange 7 (corresponding to 11 parts of C.I. Reactive Orange 7) and 28 parts of a condensation product of methylnaphthalenesulfonic acid with formaldehyde (Sumipon SE, manufactured by Sumitomo Chemical Co., Ltd.) were mixed. This mixture was dissolved in 75 parts of hot water to obtain a liquid dye mixture H having a dyeing strength of 25%. The content of an inorganic salt in this dye mixture was 10 parts per 100 parts by weight of the dye content.

The dye mixture H was left to stand at a temperature of from 25° to 30° C. for 16 hours, whereby a large amount of dyes precipitated, and the solubility in water upon expiration of 16 hours was 80 g/l. Further, in accordance with the method as described in (3) in Example 1, the upper limit in the dye concentration where a stable liquid state can be maintained for 30 minutes in an aqueous alkali solution, was determined and found to be 80 g/l.

Further, dyeing was conducted in the same manner as Dyeing 1 in Example 1 except that the dye mixture H was used instead of the dye mixture A, whereby the cotton broad cloth was dyed only in a pale orange shade as compared with the dyed product obtained in Example 1.

Further, dyeing was conducted in the same manner as Dyeing 2 in Example 1 except that the dye mixture H was used instead of the dye mixture A, whereby the cotton knitted fabric was dyed only in a pale orange shade as compared with the dyed fabric obtained in Example 1.

COMPARATIVE EXAMPLE 4

A liquid dye mixture J having a dyeing strength of 25% was prepared in the same manner as in Comparative Example 3 except that in the preparation of the dye solution in Comparative Example 3, the amount of the C.I. Reactive Orange 16 was changed to 45 parts (corresponding to 62 parts of C.I. Reactive Orange 16) and the amount of the C.I. Reactive Orange 7 was changed to 27 parts (corresponding to 38 parts of C.I. Reactive Orange 7). The content of an inorganic salt in this dye mixture was 10 parts per 100 parts of the dye content. The dye mixture J was left to stand at a temperature of from 25 to 30° C. for 16 hours, whereby the dyes precipitated, and the solubility in water upon expiration of 16 hours, was 80 g/l. Further, in accordance with the method as described in (3) in Example 1, the upper limit in the dye concentration where the dye mixture J can be maintained in a stable liquid state for 30 minutes in an aqueous alkali solution, was determined and found to be 160 g/l.

Further, dyeing was conducted in the same manner as Dyeing 1 in Example 1 except that the dyeing mixture J was used instead of the dye mixture A, whereby the cotton broad cloth was dyed only in a slightly pale orange shade as compared with the dyed product obtained in Example 1.

Further, dyeing was conducted in the same manner as Dyeing 2 in Example 1 except that the dye mixture J was used instead of the dye mixture A, whereby the cotton knitted fabric was dyed only in an equal or slightly pale orange shade as compared with the dyed product obtained in Example 1.

We claim:

1. A reactive dye mixture which comprises, as dye components, from 10 to 57% by weight of C.I. Reactive Orange 16 and from 90 to 43% by weight of C.I. Reactive Orange 7.

2. The reactive dye mixture according to claim 1, which comprises from 20 to 55% by weight of C.I. Reactive Orange 16 and from 80 to 45% by weight of C.I. Reactive Orange 7.

3. The reactive dye mixture according to claim 1, which comprises from 40 to 55% by weight of C.I. Reactive Orange 16 and from 60 to 45% by weight of C.I. Reactive Orange 7.

4. A method for dyeing cellulosic fibers, which is characterized by using a reactive dye mixture which comprises, as dye components, from 10 to 57% by weight of C.I. Reactive Orange 16 and from 90 to 43% by weight of C.I. Reactive Orange 7.

5. A reactive dye mixture which comprises, as dye components, from 10 to 85% by weight of C.I. Reactive Orange 16 and from 90 to 15% by weight of C.I. Reactive Orange 7 and which contains an inorganic salt in an amount of at most 5 parts by weight per 100 parts by weight of the dye mixture comprising the C.I. Reactive Orange 16 and the C.I. Reactive Orange 7.

6. The reactive dye mixture according to claim 5, which comprises from 20 to 75% by weight of C.I. Reactive Orange 16 and from 80 to 25% by weight of C.I. Reactive Orange 7.

7. The reactive dye mixture according to claim 5, wherein the amount of the inorganic salt is at most 3 parts by weight per 100 parts by weight of the dye mixture comprising the C.I. Reactive Orange 16 and the C.I. Reactive Orange 7.

8. The reactive dye mixture according to claim 5, wherein the amount of the inorganic salt is at most 1.5 parts by weight per 100 parts by weight of the dye mixture comprising the C.I. Reactive Orange 16 and the C.I. Reactive Orange 7.

9. A method for dyeing cellulosic fibers, which is characterized by using a reactive dye mixture which comprises, as dye components, from 10 to 85% by weight of C.I. Reactive Orange 16 and from 90 to 15% by weight of C.I. Reactive Orange 7 and which contains an inorganic salt in an amount of at most 5 parts by weight per 100 parts by weight of the dye mixture comprising the C.I. Reactive Orange 16 and the C.I. Reactive Orange 7.

* * * * *